United States Patent [19]

Pickard

[11] Patent Number: 5,235,806
[45] Date of Patent: Aug. 17, 1993

[54] FUEL FLOW SYSTEM FOR A GAS TURBINE ENGINE

[76] Inventor: Gerald W. Pickard, 10 Chestnut Close, The Lanes, Leckhampton, Cheltenham, Gloucestershire GL53 0QE, Great Britain

[21] Appl. No.: 690,901
[22] PCT Filed: Oct. 17, 1990
[86] PCT No.: PCT/GB90/01601
 § 371 Date: Aug. 8, 1991
 § 102(e) Date: Aug. 8, 1991
[87] PCT Pub. No.: WO91/05947
 PCT Pub. Date: May 2, 1991

[30] Foreign Application Priority Data
 Oct. 17, 1989 [GB] United Kingdom ............... 8923329

[51] Int. Cl.$^5$ ............................................. F62C 9/28
[52] U.S. Cl. .................................................. 60/39.281
[58] Field of Search ......................... 60/39.091, 39.281

[56] References Cited
 U.S. PATENT DOCUMENTS

| 2,686,561 | 8/1954 | Isreeli et al. | |
|---|---|---|---|
| 2,909,896 | 10/1959 | Porter | |
| 4,578,945 | 4/1986 | Peck et al. | |
| 4,760,662 | 8/1988 | Dyer et al. | 60/39.281 |
| 4,817,376 | 4/1989 | Brocard et al. | 60/39.281 |
| 5,088,278 | 2/1992 | Smith et al. | 60/39.281 |

FOREIGN PATENT DOCUMENTS

| 0237387 | 9/1987 | European Pat. Off. |
| 0288412 | 10/1988 | European Pat. Off. |
| 2406079 | 5/1979 | France |
| 568054 | 3/1945 | United Kingdom |
| 1492710 | 11/1977 | United Kingdom |
| 2121116 | 12/1983 | United Kingdom |

Primary Examiner—Louis J. Casaregola
Attorney, Agent, or Firm—Young & Thompson

[57] ABSTRACT

A fluid flow system suitable for controlling the flow of fuel to an engine comprises a fuel metering valve (2) to produce a metered output flow of fuel, and a pressure difference regulator (3) that is responsive to the pressure difference across said fuel metering valve (2) and operates in conjunction therewith to control said output flow of fuel, characterized in that the system includes a system control valve assembly (4) which in the event of a malfunction or failure of the system acts to regulate the output flow of fuel in order to alleviate the effects of the malfunction or failure. First valve means (7) of the valve assembly (4) controls an output line from the pressure difference regulator (3) to a fuel return line (18,19). An augmenting valve (5) is connected between the input (12) and output (14) of the fuel metering valve (2). Second valve means (7B) of the valve assembly (4) is connected between the fuel supply line (12) and the fuel return line (19) so as to produce a return flow of fuel from the input of the fuel metering valve (2).

7 Claims, 3 Drawing Sheets

FUEL FLOW SYSTEM FOR A GAS TURBINE ENGINE

TECHNICAL FIELD

This invention relates to a fluid flow system, and, in particular, to a fluid flow system having inbuilt fail-safe fluid controlling means.

In presently known forms of fluid flow systems the control of fluid flow rate to, for example, an aircraft engine, is achieved by means of a fluid flow metering valve having a pressure difference regulator to control the fluid flow rate through the metering valve. In the event of a malfunction or failure of the system, the system itself has no means to regulate fluid flow through the system to counteract the effects, e.g. overspeed or underspeed, to the engine. However independent overspeed governor valves are provided.

DISCLOSURE OF THE INVENTION

The present invention is concerned with providing a fluid flow system having inbuilt fail-safe fluid controlling means, that in the event of a malfunction or failure of the system acts to regulate the system and counteract the effects of malfunction or failure.

In accordance with the present invention, a fluid flow system suitable for controlling the flow of fuel to an engine comprises a fuel metering valve to produce a metered output flow of fuel, and a pressure difference regulator that is responsive to the pressure difference across said fuel metering valve and operates in conjunction therewith to control said output flow of fuel, characterised in that the system includes a system control valve assembly which in the event of a malfunction or failure of the system acts to regulate the output flow of fuel in order to alleviate the effects of the malfunction or failure.

In a preferred embodiment of the present invention, the fluid flow system further comprises an augmenting valve assembly. The augmenting valve assembly is supplied so that in the event of the fluid flow across the system being too low and the pressure difference across the system rising above that encountered under normal operating conditions, the augmenting valve assembly is caused to crack open and allow fluid to flow therethrough. Hence the fluid flow across the system can be restored to the desired level. This increase in pressure in the system may also result in the fluid flow through the fuel metering valve increasing.

In order to enhance the operation of the system, it is desirable that under normal operating conditions the augmenting valve assembly remains closed preventing flow therethrough. In order to achieve this, the augmenting valve assembly may be designed so that it cracks open at a higher pressure differential across the system than would normally be encountered, typically in excess of 10-20% greater than the normal pressure difference.

Preferably, the system further comprises a minimum pressure valve in the line supplying fuel to the engine so that there is a minimum pressure within the system in order to maintain the ability of the system to position valves and bypass excess pump flow relative to engine demand back to reservoir.

The pressure difference regulator, fuel metering valve and minimum pressure valve assembly can be any of the known and available devices designed for the specific service they perform. The particular design of the components is not critical to the operation of the present invention however the function which they perform is important.

The system control valve assembly, preferably, comprises a valve which includes an electromechanical interface. The advantage of utilising a valve which includes an electromechanical interface is that a microprocessor can be used to electronically control the operation of the system in response to signal from the engine, in addition to the system being responsive to partly mechanically derived signals.

In a preferred embodiment of the present invention, the operation of the system is controlled by a microprocessor in response to engine condition signals.

In one embodiment of the present invention, the system control valve assembly comprises an electrohydraulic servo valve. The servo valve may comprise a solenoid operated torque motor which moves and operates a flapper, and a three landed spool which is moved by hydraulic pressure in response to adjustment of the flapper.

In operation, the system control valve assembly acts to increase or decrease the flow of fuel to the engine in the event of a malfunction or failure of the system.

It is only in the event of the fuel metering valve failing in the closed position, or at too restrictive an aperture, that the augmenting flow valve will be caused to crack open.

The invention will now be described by way of example with reference to the accompanying drawings.

BEST MODE OF CARRYING OUT THE INVENTION

Figure 1:
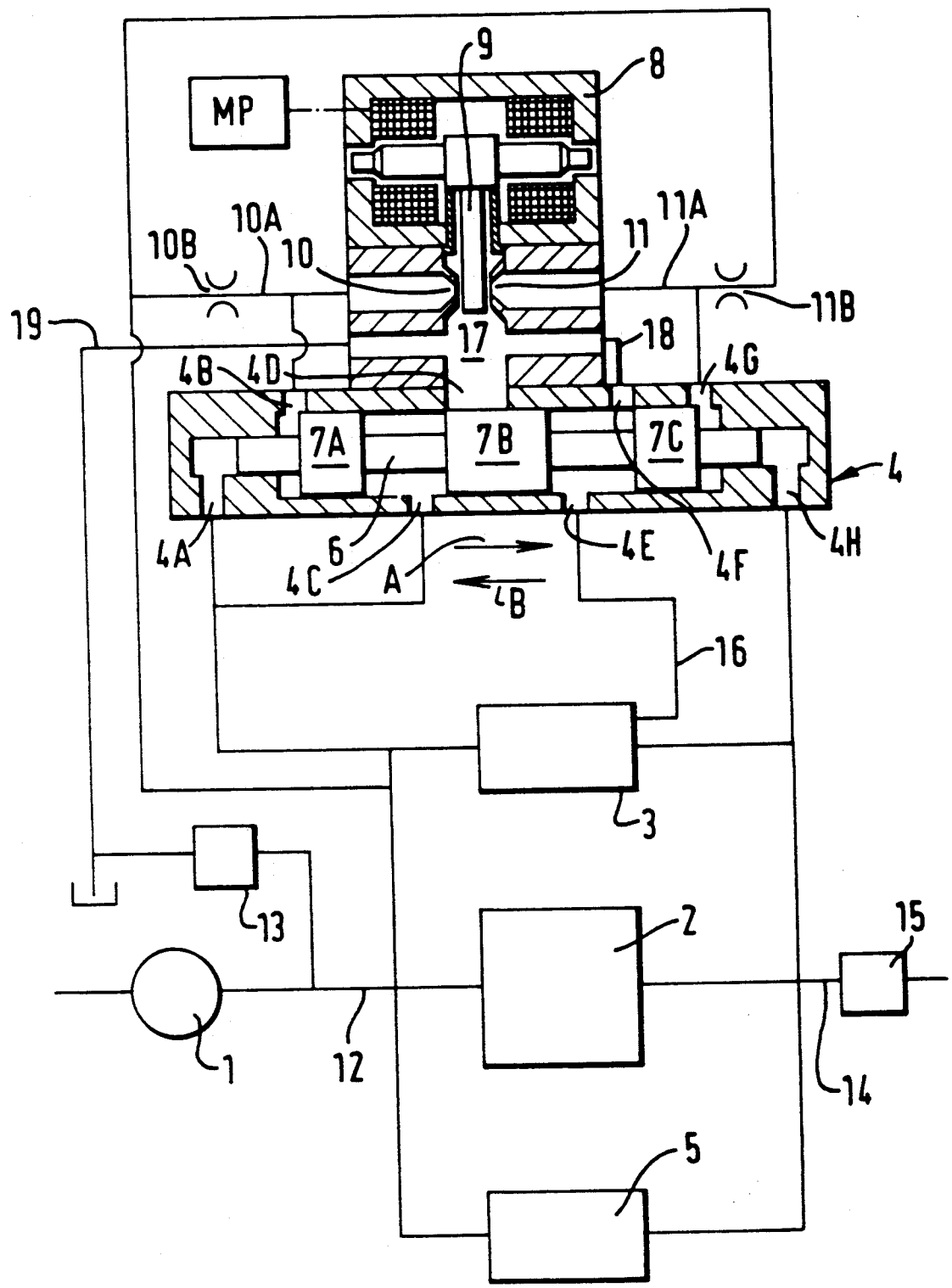
FIG. 1 shows a schematic representation of a fluid flow system made in accordance with the present invention.

Now referring to FIG. 1 of the drawings, a fluid flow control system made in accordance with the present invention, and suitable for use in the fuel supply system to an aircraft engine, comprises a fuel pump 1, a fuel metering valve 2, a pressure difference regulator 3 to control the fuel flow rate through the fuel metering valve 2, a system control valve assembly 4, and an augmenting flow valve 5.

The augmenting flow valve 5 is configured so that at normal operating conditions no fluid flows through the valve. However, should the pressure difference across the system increase above that normally encountered, the augmenting flow valve 5 will crack open. For example, in a system where the pressure difference under normal operating conditions is 50 psi, the augmenting flow valve 5 may crack open at a pressure difference of 60 psi allowing a supplemental flow of fluid therethrough to the engine.

The system control valve assembly 4 has eight ports 4A to 4H, and includes a spool 6 having three landed sections 7A, 7B, 7C; a torque motor 8 which controls the position of a flapper 9; and a nozzle arrangement, having two nozzles 10, 11 opposing one another and which act in conjunction with a flapper 9 to position the spool 6.

The flow of fluid to the nozzles 10, 11 is direct from the pump 1 outlet, via lines 10A and 11A to the respective nozzle. Each of the lines 10A and 11A is provided with a fixed restrictor 10B and 11B. The lines 10A and 11A are open to the outwardly showing end of a respective landed section 7A or 7C at a position between the nozzle 10 or 11 and the fixed restrictor 10B or 11B.

In order to effect movement of the spool 6 the flapper 9 is moved under the action of the torque motor 8 and thereby the pressure in the lines 10A and 11A is altered. This in turn adjusts the pressure balance across the spool 6 and causes the spool 6 to move in accordance with the change in the pressure balance.

In practice, the fixed restrictors 10A and 11B and the nozzles 10, 11 are sized so that under identical flow conditions equal force is applied to the flapper 9 by the flow through the respective nozzle.

The ports 4A and 4H of the system control valve assembly simply connect to a respective end of the spool 6 in order to provide a pressure balance across the spool 6 by balancing the selected pressure difference with the actual pressure difference in the system and so determine the position of the spool and thereby the three landed sections 7 with respect to the remaining ports 4B to 4G.

The high pressure output side of the fuel pump 1 is connected via a line 12 to the fuel metering valve 2. The line 12 has several branch lines and sub-branches which also connect the output from the fuel pump 1 to port 4A and 4C of the system control valve assembly 4; the input side of the pressure difference regulator 3; and the input side of the augmenting flow valve 5.

A pressure relief valve 13 connects the output line 12 of the pump 1 to the system reservoir so as to spill fluid in the event of excessive pressure build up in the system if it fails.

The output from the fuel metering valve 3 constitutes the low pressure side of the control system and supplies fuel to the engine along a line 14. The line 14 is also connected to port 4H of the system control valve assembly 4 and to the output side of the augmenting flow valve 5.

A minimum pressure valve 15 is provided in the line 14.

A line 16 connects the port 4E of the system control valve assembly 4 with the output side of the pressure difference regulator 3.

The remainder of the ports of the system control valve assembly 4 are connected as follows: port 4B to the first nozzle 10 of the nozzle arrangement; port 4G to the second nozzle 11 of the nozzle arrangement; port 4D to the chamber 17; and port 4F to a line 18 which connects to the chamber 17.

A line 19 connects the chamber 17 to the reservoir.

In normal operation of the system, the fuel pump 1 pumps fuel into the system. This fuel flow divides into two distinct fuel flow streams, the required fuel flow stream and the excess fuel flow stream. The required fuel flow stream passes through the fuel metering valve 2 and the minimum pressure valve 15 and into the engine where it is consumed. The excess fuel flow stream passes through the pressure difference regulator 3, along line 16, through port 4E and 4F, along the line 18, through chamber 17 and from there along the line 19 to reservoir to be recycled when required.

The position of the spool 6 in relation to the ports of the system control valve assembly 4 is dependent upon the operational status of the system.

If the system is operating to its designed characteristics, the pressure difference regulator 3 and the fuel metering valve 2 effect control of the fluid fuel flow rate to the engine, and the system control valve assembly 4 has no control upon the operation of the system. In these circumstances, the spool 6 is centrally positioned in the system control valve assembly 4, and the line connected to port 4B is open to the outwardly facing end of the landed section 7A of the spool 6, and the line connected to the port 4G is open to the outwardly facing end of the landed section 7C of the spool 6. Further, the landed section 7B prevents fluid flow into the chamber 17, and port 4E is in unimpeded communication with port 4F.

In the event of malfunctions of the system which cause the required fuel stream flow rate to be too low or too high, and the engine to enter an underspeed or overspeed situation, the system control valve assembly 4 is operated to limit or restore the required fuel stream flow rate and thereby correct the situation. The following table summarises the different possible malfunctions and the corrective actions taken, as described thereafter.

| Malfunction/ Failure of System Unit | Position Upon Failure of System Unit | Action of Control Valve |
|---|---|---|
| Pressure Difference Regulator | Open | Adjustment to Increase fuel flow to engine |
| | Closed | Adjustment to Limit fuel flow to engine |
| Fuel Metering Valve | Open | Adjustment to Limit Fuel flow to engine |
| | Closed | Adjustment to Increase fuel flow to engine |

In the event that the pressure difference regulator 3 fails in the closed position or the metering valve 2 fails in the open position there will be an excessive flow of fuel into the engine, and the engine will enter an overspeed situation in response to which it will be necessary to limit the flow of fuel to the engine. In order to limit the flow of fuel to the engine, the spool 6 of the system control valve assembly 4 is moved to the right (in the direction of arrow A) so that the landed section 7B opens the port 4D and thereby connects chamber 17 with the port 4C to allow fluid to flow via the line 19 to the reservoir. In operation, the flow of fuel into the engine is adjusted by controlling the spool 6 to vary the extent to which the landed section 7B opens the port 4D and allows the return flow of fuel along the line 19 to the reservoir.

In the event that the pressure difference regulator 3 fails in the open position, the flow of fuel through the metering valve 2 to the engine will be severely reduced and the engine will enter an under speed situation in response to which it will be necessary to restore the flow of fuel to the engine. In order to restore the flow of fuel to the engine, the spool 6 of the system control valve assembly 4 is moved to the left (in the direction of arrow B) so that the landed section 7C of the spool 6 restricts the flow of fuel through the port 4F. Thus the spool 6 regulates the return flow and so controls the delivery of fuel by valve 2 to the engine.

In the event that the fuel metering valve 2 fails in the closed or partially closed position, the flow of fuel through to the engine is significantly reduced or cut off and the engine initially enters an underspeed situation in response to which it will be necessary to restore the flow of fuel to the engine. In order to restore the flow of fuel to the engine, the spool 6 of the system control valve assembly 4 is moved to the left (in the direction of arrow B) so that the landed section 7B of spool 6 takes over the control of the pressure difference across the system and negates the effect of the pressure difference regulator 3. In this way, the pressure difference across the system is increased until the augmenting flow valve 5 is cracked open and takes over the function of the fuel metering valve 2.

The operation of the system control valve assembly 4 is controlled by a microprocessor MP in response to signals received indicative of engine condition, for example, overspeed or underspeed. The signals received as to engine condition are provided by sensors of standard manufacture mounted in the engine in the appropriate position.

Figure 2:
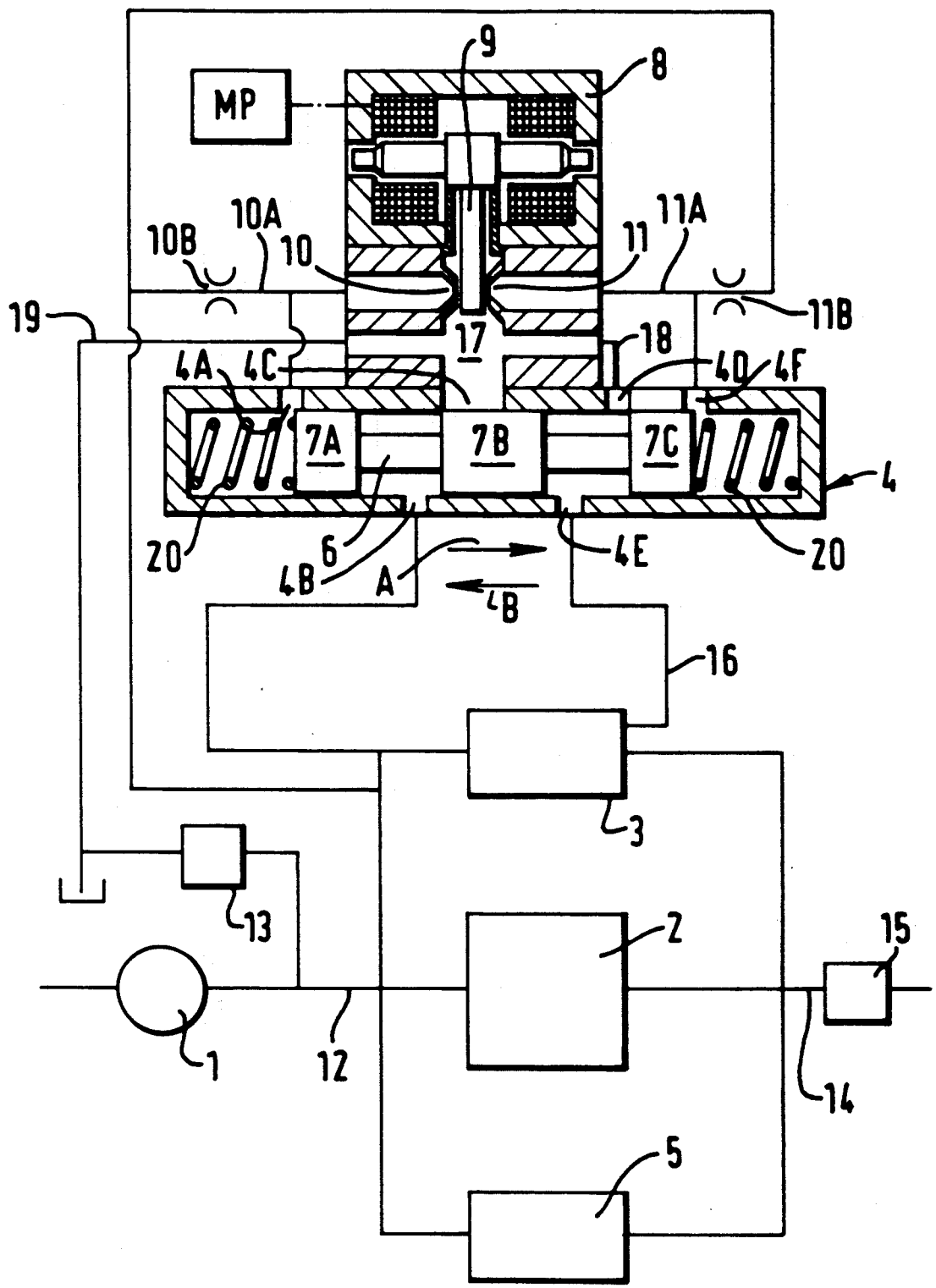
FIG. 2 shows a similar schematic representation of an alternative fluid flow system to that of FIG. 1.

An alternative embodiment of the invention is illustrated in FIG. 2 which is similar in all respects to that of FIG. 1 except that instead of the ends of the system control valve assembly 4 being connected across the fuel metering valve 3 so as to be pressure balanced, springs 20 are provided at these ends so as to act on the spool 6 and spring balance it in the centralised position.

Figure 3:
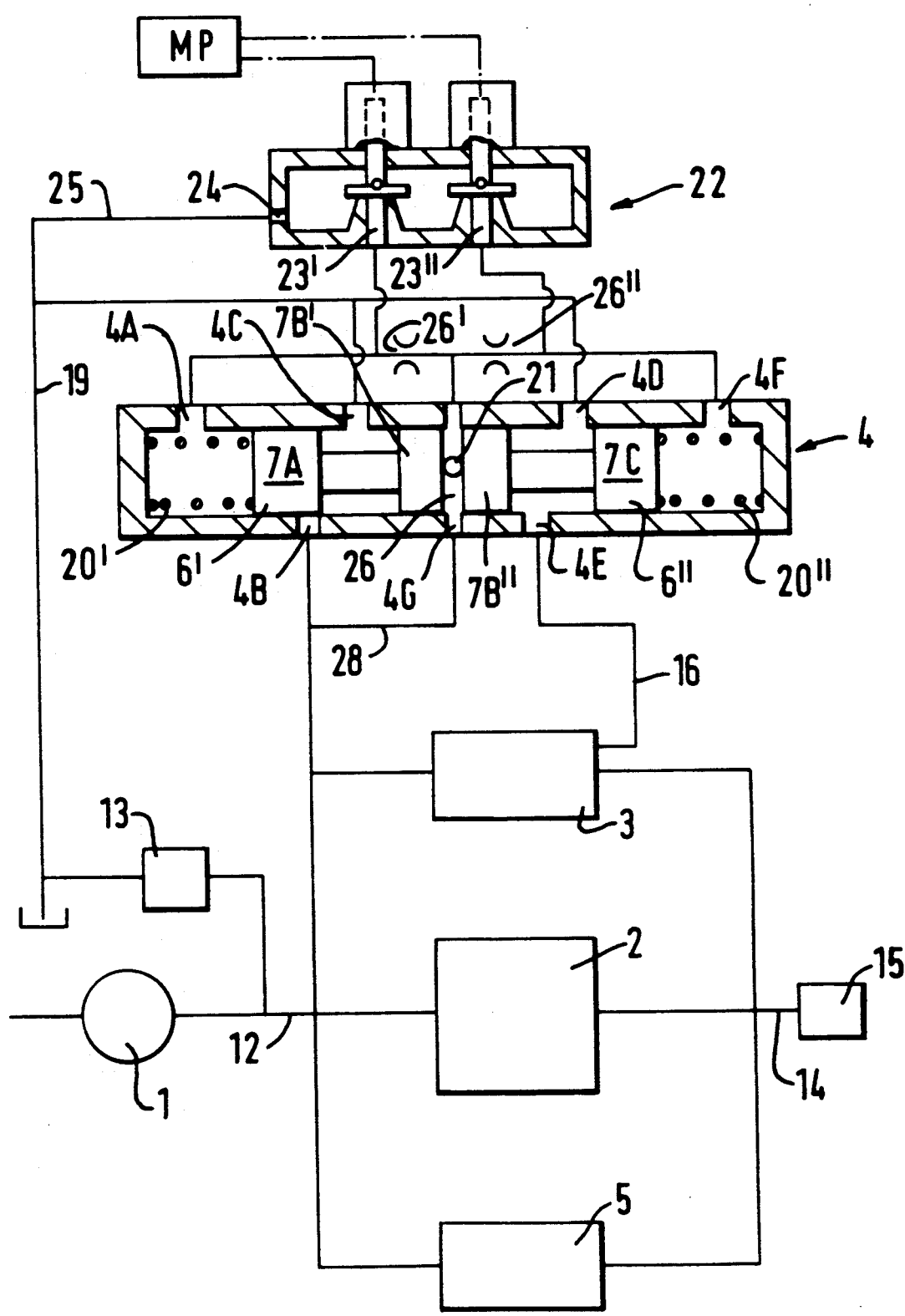
FIG. 3 shows a similar schematic representation of another alternative fluid flow system to that of FIGS. 1 and 2.

Yet another embodiment of the invention is illustrated in FIG. 3 in which the system control valve assembly 4 comprises a valve having double coaxial spools 6',6" which are spring loaded together against a central stop 21 by springs 20',20" at opposite extreme ends. Both spools are controlled independently by an electrical operated two-way actuator 22 which opens one or the other of two normally closed input ports 23',23" and thereby connects them to an output port 24 which is connected by a line 25 to return line 19 to the reservoir. Each input port 23',23" is connected to a respective port 4A, 4F at the outer end of a spool 6',6", and is connected via a respective restrictor 26,26' to the central volume 27 between the two spools 6',6". An input pressure line 28 is tapped off from the input line 12 and is connected via port 4C to the central volume 27.

If the system is operating in its normal mode, the actuator is de-energised and both ports 23',23" are closed causing the input pressure in volume 27 to be transferred via each restrictor 26',26" to the outer ends of the spools 6',6". Both spools are then urged into engagement with the central stop by the springs 20',20". In this position, the landed section 7A of the one spool 6' closes the port 4B, and the two ports 4F and 4D are interconnected for the return flow from the pressure difference regulator 3 to the return line 19.

If there is a malfunction of the system which causes an excess supply of fuel into the engine, corrective action is initiated under the control of the microprocessor MP which involves energisation of the actuator 22 to open the port 23'. As a result of this action, the pressure in the left hand and of the valve 4 is vented to reservoir via port 4A, port 23', port 24, line 25 and line 19. The left hand spool 6' is therefore moved to the left under the effect of the input pressure in the central volume 27, causing the landed section 7A to open the port 4B and connect it to the port 4C. Fuel is thereby returned from the input line 12 to the reservoir via lines 18, 19, and the fuel supply to the engine is reduced.

If there is a malfunction of the system which causes the supply of fuel into the engine to fail or be severely reduced, corrective action is taken under the control of the microprocessor MP to energise the actuator 22 in the other sense to that described above, opening the other port 23". As a result of this action, the pressure in the right hand end of the valve 4 is vented to reservoir via port 4F, port 23", port 24, line 25 and line 19. The right hand spool 6" is therefore moved to the right by the central pressure in volume 27 and causes the spool 6" to close the port 4F, thereby reducing or cutting off the return flow of fuel from the pressure difference regulator 3. The pressure difference across the system therefore rises until the augmenting flow valve 5 opens to provide a flow of fuel to line 14 and into the engine.

I claim:

1. A fluid flow system suitable for controlling the flow of fuel to an engine comprising a fuel metering valve to produce a metered output flow of fuel, and a pressure difference regulator that is responsive to the pressure difference across said fuel metering valve and operates in conjunction therewith to control said output flow of fuel, and a control valve system comprising first valve means which is connected between a return flow output of the pressure difference regulator and a fuel return line of the fluid flow system and which operates in response to an abnormally low output flow from the metering valve by reducing the return flow of fuel from the fuel output of the pressure difference regulator to the fuel return line.

2. A system as claimed in claim 1 which includes an augmenting valve assembly (5) which is connected between the input (12) and output (14) of the fuel metering valve (2) and is adapted to open and provide a flow of fuel that by-passes the fuel metering valve (2) when the pressure difference across the fuel metering valve (2) exceeds a normal maximum pressure difference.

3. A system as claimed in claim 1 in which the control valve system comprises second valve means (6) connected between a fuel supply line (12) to the fuel metering valve (2) and said fuel return line (19) of the system so as to produce a return flow of fuel from the input of the fuel metering valve (2) when the fuel metering valve (2) delivers excess fuel corresponding to a malfunction or failure.

4. A system as claimed in claim 3 in which the control valve system comprises a spool valve (6) which incorporates said first valve means and said second valve means.

5. A system as claimed in claim 4 in which the spool valve (6) is electrically operated.

6. A system as claimed in claim 1 including an electronic controller which controls operation of the control valve system (4) in response to electrical inputs from malfunction or failure sensors.

7. A system as claimed in claim 1 which includes a minimum pressure valve (13) connected between a fuel supply line (12) to the fuel metering valve (3) and a fuel return line (18, 19) of the system fluid flow in order to vent excess pressure from the system.

* * * * *